United States Patent
Treutler et al.

[11] Patent Number: 5,705,745
[45] Date of Patent: Jan. 6, 1998

[54] MASS FLOW SENSOR

[75] Inventors: Christoph Treutler, Wannweil; Detlef Gruen; Horst Muenzel, both of Reutlingen; Helmut Baumann, Gomaringen; Steffen Schmidt; Andreas Lock, both of Reutlingen, all of Germany

[73] Assignee: Robert Bosch GmbH, Stuttgart, Germany

[21] Appl. No.: 700,745

[22] Filed: Jul. 29, 1996

[30] Foreign Application Priority Data

Jul. 29, 1995 [DE] Germany .................. 195 27 861.5

[51] Int. Cl.[6] ............................................. G01F 1/68
[52] U.S. Cl. ............................................. 73/204.26
[58] Field of Search ..................... 73/204.25, 204.26, 73/2

[56] References Cited

U.S. PATENT DOCUMENTS

| | | | |
|---|---|---|---|
| 4,888,988 | 12/1989 | Lee et al. | 73/204.26 |
| 5,396,795 | 3/1995 | Araki | 73/204.26 |
| 5,406,841 | 4/1995 | Kimura | 73/204.26 |

Primary Examiner—Elizabeth L. Dougherty
Assistant Examiner—Jewel Artis
Attorney, Agent, or Firm—Kenyon & Kenyon

[57] ABSTRACT

In a mass flow sensor having a frame of monocrystalline silicon and a membrane fixed therein, a heating element and, if indicated, temperature-measuring elements are provided on the membrane. A heat-conducting element, which extends from the membrane across the frame, is provided in the edge area of the membrane. The heating element, the heat-conducting element and, if indicated, temperature-measuring elements are patterned out of a single metal layer.

10 Claims, 2 Drawing Sheets

MASS FLOW SENSOR

BACKGROUND INFORMATION

U.S. Pat. No. 4,888,988 describes a mass airflow sensor having a frame of monocrystalline silicon, in which a membrane of dielectric material is fixed. Arranged on the membrane are a heating element and a plurality of temperature-measuring elements, which are patterned out of a metal layer. To achieve an exact reproducibility of the membrane, a heavily doped, etched frame is provided, which defines the external dimensions of the membrane. The accuracy with which the heating element is positioned relative to this etched frame depends on the accuracy of the positioning during the photolithographic patterning of the metal layer.

SUMMARY OF THE INVENTION

The mass flow sensor according to the present invention has the advantage of enabling an especially exact adjustment of the heating element relative to the heat-conducting element. This ensures that there will be a reproducible heat flow (flux), starting from the heating element, and continuing through the membrane. In addition, the sensor will thus be able to have a very symmetrical design.

The membrane is patterned quite simply out of a membrane layer, which also extends across the top side of the frame. Openings can advantageously be provided in this case, which will enable a direct thermal coupling of the heat-conducting element onto the silicon of the frame. As a result, the heat flow from the heat-conducting element into the silicon frame is improved. Platinum is an especially suitable material for the metal layer. The thermal conductivity of the heat-conducting element can be improved by other metal layers. A particularly useful improvement is achieved by disposing these other metal layers directly on or underneath the metal layer. Another way to arrange the other metal layers includes isolating them from the metal layer by a dielectric layer.

DETAILED DESCRIPTION

Figure 1:
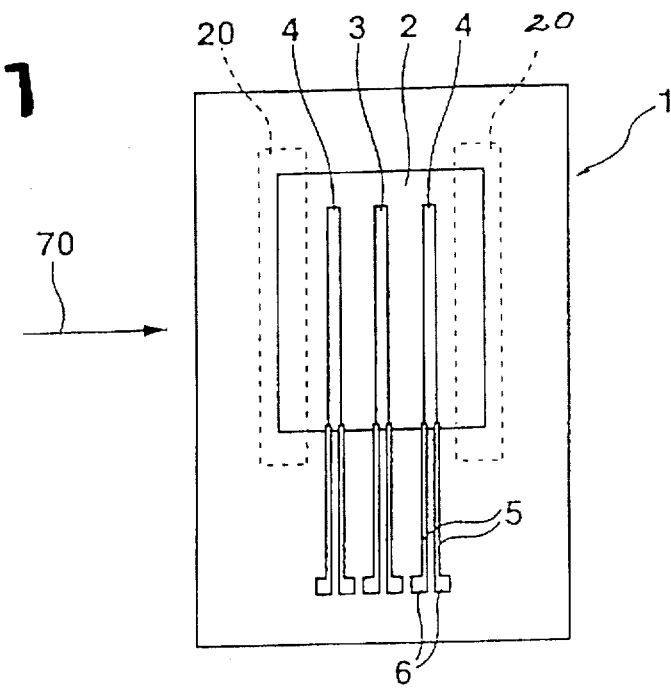
FIG. 1 shows a plan view of the sensor according to the present invention.
Figure 2:
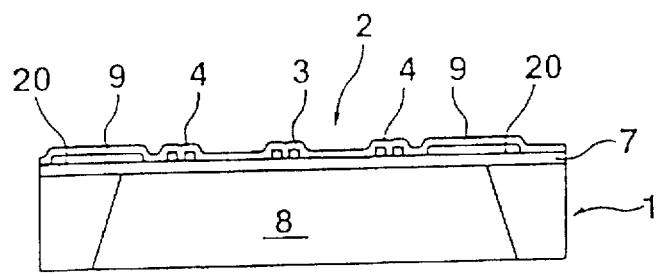
FIG. 2 shows a cross-sectional view of an exemplary embodiment of the sensor according to the present invention.

FIG. 1 shows a plan view, and FIG. 2 a cross-section through a mass flow sensor according to the present invention. The mass flow sensor has a frame 1 of monocrystalline silicon, in which a membrane 2 is fixed. A heater 3 and two temperature sensors 4 are arranged on the membrane. The heater 3 and the temperature sensors 4 are contacted by interconnect traces 5 and are able to be connected through bonding pads 6 to external operating and evaluation circuits. In the edge area of the membrane 2, lamellar heat-conducting elements 20 are provided, which overlap both the membrane 2, as well as one part of the silicon frame 1.

By means of the heater 3, the membrane 2 is heated to a value which lies over the ambient temperature. When, as indicated by the arrow 70, a medium flow, in particular an air flow, flows along the top side of the membrane 2, then this medium flow has an attendant cooling of the membrane 2. In the present case, this cooling of the membrane 2 is evaluated by the two temperature sensors 4, the temperature sensor 4 situated upstream being cooled more vigorously than the temperature sensor 4 situated downstream. Alternatively, it is also possible to determine the cooling of the membrane by measuring the resistance of the heating element 3. In addition, all other forms of temperature sensors, even single sensors, can also be used. The heater 3 is a resistor which is traversed by the flow of a current. This current flow heats the heater 3. The temperature-measuring elements 4 are likewise resistors, which are made of a material whose resistance is temperature-dependent. An especially suitable material for the heater 3 and the temperature sensors 4 is platinum, which has an excellent chemical stability and a high temperature-dependency of the resistance. However, other metal layers may also be used for sensors of this type.

The heating element 3 and the temperature sensors 4 are expediently manufactured by depositing a metal layer over the entire surface. The heating element 3 and the temperature-measuring elements 4 are then patterned out of this full-surface metal layer by means of photolithography and etching. In so doing, the interconnect traces 5 and the bonding pads 6, which differ from the heating element 3 or the temperature-measuring elements 4 only with respect to the width of the pattern, may also be patterned out at the same time. As a rule, a membrane layer 7, which initially covers the entire surface of the top surface of a silicon substrate, is provided for the membrane 2. Then, starting out from the rear side, a recess 8, which extends from the rear side up to the membrane layer 7, is etched into the silicon substrate. By means of this recess 8, the frame 1 is also formed. Thus, a silicon frame 1 is formed, on whose top side the membrane layer 7 also extends. The recess 8 is not able to be introduced with any desired precision. Therefore, the geometric dimensions of the membrane area 2 or the exact position of the heating element 3 on the membrane 2 are subject to certain variations.

What is problematic here is that the characteristic of the mass flow sensor, i.e., the sensor signal as a function of the flow, is influenced by the dimensions of the membrane 2. The reason for this is that a substantial portion of the heat generated by the heating element 3 is not dissipated by the medium flowing past, but rather is discharged across the membrane layer 7 or the passivation layer 9, which is deposited on the top side of the sensor, to the silicon frame 1. This portion varies in response to a variation of the geometric dimensions of the membrane 2. When the sensor signal is evaluated by the temperature-measuring element 4, the sensor signal also depends upon the position of the temperature-measuring elements 4 relative to the frame 1. What especially has a disruptive effect is when a differential signal is generated in some form by two temperature sensors 4, since an asymmetrical configuration of the temperature-measuring elements 4 relative to the frame 1 is then manifested in a corresponding asymmetry of the characteristic of the sensor. It is, therefore, desirable to be able to precisely control the heat flow through the membrane 2, in order to thus ensure a qualitatively high-grade characteristic of the sensor.

The heat-conducting elements 20 are provided for this purpose in the edge area of the membrane 2. These heat-conducting elements 20, which are formed in FIGS. 1 and 2 as lamellar heat-conducting elements, overlap the edge area of the membrane 2 and of the frame 1. The heat-conducting elements 20 are patterned photolithographically out of the metal layer in the same manufacturing step as that of the heating element 3 and of the temperature-measuring elements 4. Since all the patterns are available on a single mask, a high precision of the relative positions of the heat-conducting elements 20 is able to be obtained relative to the temperature-measuring elements 4 or to the heating element 3.

When during manufacturing, as shown in FIG. 2, the mask used for patterning the metal layer gets out of adjustment to a certain degree relative to the recess 8, the conditions for the heat dissipation in the membrane nevertheless remain constant. This lies in that the thermal conductivity of the membrane layer 7 is less than the thermal conductivity of the heat-conducting elements 20. This lies principally in the selection of the materials. Thin layers of silicon oxide and silicon nitride having a thermal conductivity of 1.6 or 15 kcal/m h °C. are used for the membrane layer 7. In contrast, silicon has a thermal conductivity of 180 and platinum of 60 kcal/m h °C. Typical thicknesses of the membrane layer 7 lie in the order of magnitude of 1 to 2 µm, for the metal layer of 0.1–0.3 µm, and for the frame 1 in the order of magnitude of a few 100 µm. Therefore, the thermal conductivity of the frame 1 can be of any desired quantity relative to the membrane 2 or the metal layer.

Although the metal layer only has a small thickness, the higher thermal conductivity of the metal results in an improved thermal conductivity over the membrane. Therefore, the high degree of precision, which is attainable with the configuration of the heat-conducting elements 20 relative to the heating element 3 or to the temperature-measuring elements 4, results in an improved characteristic. Above all, it is advantageous that the heat-conducting elements shown in FIGS. 1 and 2 do not require any additional outlay in the manufacturing of the sensors.

In manufacturing the sensor, one begins with a silicon substrate. A membrane layer 7 of silicon oxide, silicon nitride or similar materials is then deposited onto the top side. A metal layer, out of which a heating element 3, temperature-measuring elements 4, interconnect traces 5, bonding pads 6, and the heat-conducting elements 20 are patterned by means of photolithography and etching, is then applied over the entire surface of the membrane layer 7. The interconnect traces 5 and the bonding pads 6 can also include a different material, which is deposited and patterned prior to or after the patterning of the metal layer. Alternatively, after that, the surface of the sensor can still be covered with a dielectric protective layer 9. In another process step, the recess 8 is etched in, starting from the rear side. The frame 1 is thus created in this manner, and the dimensions of the membrane 2 are established. In so doing, it is difficult to define both the absolute measurements of the recess 8 or the position relative to the heater 3.

Figure 3:
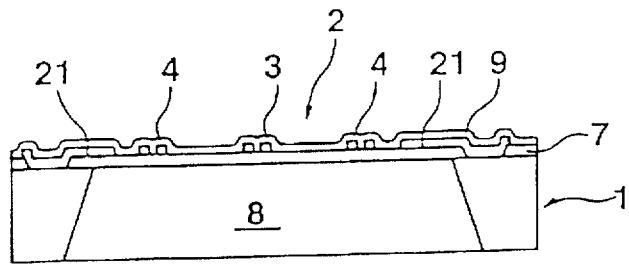
FIG. 3 shows a cross-sectional view of another exemplary embodiment of the sensor according to the present invention.

Another exemplary embodiment of the sensor is shown in FIG. 3. The structure corresponds essentially to the known structure from FIGS. 1 and 2, so that parts having the same function have been given the same reference numerals. However, in contrast to the sensor according to FIGS. 1 and 2, heat-conducting elements 21 are provided, which are in direct contact with the silicon of the frame 1. Provided for that purpose in the membrane layer 7 on the frame 1 are openings in which the metal layer of the heat-conducting elements 21 rests directly on the silicon. These openings are produced prior to deposition of the metal layer, out of which the heat-conducting elements 21 or the heating element 3 and the temperature-measuring elements 4 are patterned. Now, the temperature-measuring elements 4 are patterned. Now, since no membrane layer 7 having poor thermal conductivity is provided between the heat-conducting elements 21 and the silicon, the thermal conductivity of the heat-conducting elements 21 is improved, through which means the characteristic of the sensor is also further improved.

Figure 4:
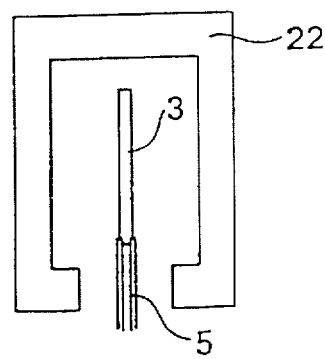
FIG. 4 shows a plan view of another exemplary embodiment of the sensor according to the present invention.

FIG. 4 illustrates a plan view of another embodiment of the heat-conducting element. For the sake of simplicity, only the heater 3 and the U-shaped heat-conducting element 22 are shown, which completely surrounds the heater 3 on at least three sides. Only where the interconnect traces 5 have to be led up to the heating element 3 is there a gap provided in the heat-conducting element 22.

Figure 5:
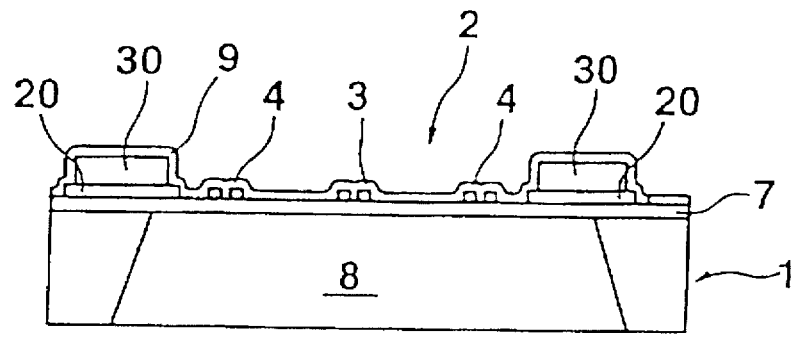
FIG. 5 shows a cross-sectional view of yet another exemplary embodiment of the sensor according to the present invention.
Figure 6:
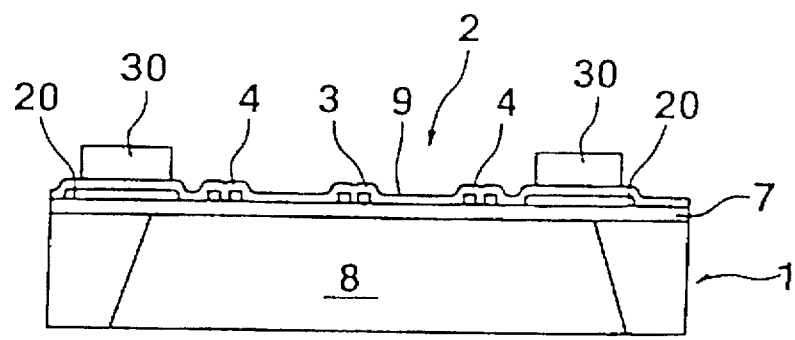
FIG. 6 shows a cross-sectional view of still another exemplary embodiment of the sensor according to the present invention.
Figure 7:
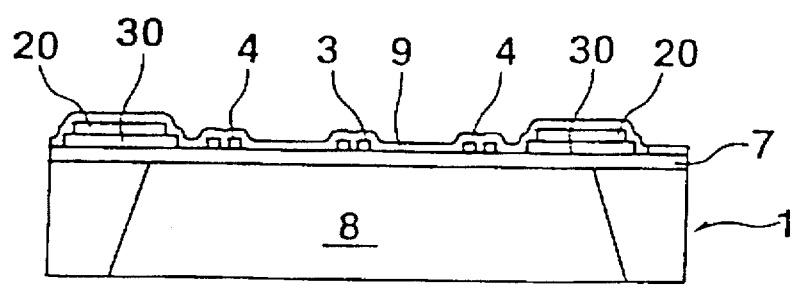
FIG. 7 shows a cross-sectional view of still another exemplary embodiment of the sensor according to the present invention.

FIGS. 5 through 7 reveal cross-sections through other exemplary embodiments of the sensor, which each have a frame 1 of monocrystalline silicon with a membrane 2 fixed therein, the membrane 2 including a membrane layer 7. Also provided in each case is a heater 3 and two temperature-measuring elements 4. In comparison to FIG. 2, the sensors according to FIGS. 5 through 7 differ only with respect to the refinement of the heat-conducting elements.

Another metal layer 30, which is able to receive a portion of the heat flowing through the heat-conducting element 20, is provided in FIG. 5 on the heat-conducting element 20. FIG. 6 depicts that the heat-conducting element 20 is covered with the passivation layer 9 and that another metal layer 30 is then provided on the top side of the passivation layer 9 above the heat-conducting element 20. FIG. 7 illustrates that another metal layer 30 is arranged directly on the membrane layer 7 underneath the heat-conducting elements 20.

The other metal layers 30 constitute elements which are able to receive a portion of the heat flux flowing through the heat-conducting elements 20. When the other metal layers 30 are able to be produced with the same precision as the heat-conducting elements 20, they contribute to the same extent to improving the characteristic. However, since the other metal layers 30 are produced, as a rule, in separate manufacturing steps, the positioning of these other metal layers 30 is, as a rule, less accurate. However, if the precision with which these other metal layers is produced is better than the precision with which the recess 8 can be introduced, an improvement in the characteristic of the sensor is also achieved by the other metal layers 30. As a rule, the other metal layers will be provided when the manufacturing method requires using other metal layers anyway, e.g. for the interconnect traces 5, the bonding pads 6, or for other reasons.

What is claimed is:

1. A mass flow sensor comprising:
    a frame composed at least partially of monocrystalline silicon;
    a membrane fixed in the frame, the membrane having an edge;

a metal layer;

a heating element patterned out of the metal layer, the heating element being arranged on the membrane;

at least one temperature-measuring element patterned out of the metal layer; and at least one heat-conducting element patterned out of the metal layer, the heat-conducting element being arranged at the edge of the membrane, the heat-conducting element extending from the membrane across the frame, the heat-conducting element conducting heat from the heating element.

2. The mass flow sensor according to claim 1, wherein the membrane includes a membrane layer, the membrane layer extending across a top side of the frame.

3. The mass flow sensor according to claim 2, wherein, in a vicinity of the frame, the membrane layer has an opening, the heat-conducting element being in direct contact with the silicon of the frame through the opening.

4. The mass flow sensor according to claim 1, wherein the metal layer includes platinum.

5. The mass flow sensor according to claim 1, wherein the membrane includes at least one of silicon oxide and silicon nitride.

6. The mass flow sensor according to claim 1, further comprising an additional metal layer arranged on the heat-conducting element.

7. The mass flow sensor according to claim 6, further comprising a dielectric passivation layer arranged on the heat-conducting element, below the additional metal layer.

8. The mass flow sensor according to claim 1, further comprising an additional metal layer arranged underneath the heat-conducting element.

9. The mass flow sensor according to claim 1, wherein the temperature-measuring element is arranged on the membrane on two sides of the heating element.

10. The mass flow sensor according to claim 1, wherein the heat-conducting element has a first thermal conductivity greater than a second thermal conductivity of the membrane.

* * * * *